Nov. 18, 1952 C. E. JOHANSSON Re. 23,585

FREIGHT CAR CONSTRUCTION

Original Filed July 19, 1949 4 Sheets-Sheet 1

~INVENTOR~
CARL E. JOHANSSON
~BY~ Samuel Reese
~ATT'Y~

FREIGHT CAR CONSTRUCTION

Original Filed July 19, 1949 4 Sheets-Sheet 2

~INVENTOR~
CARL E. JOHANSSON
BY~ Samuel Reese
~ATT'Y.~

Nov. 18, 1952 C. E. JOHANSSON Re. 23,585

FREIGHT CAR CONSTRUCTION

Original Filed July 19, 1949 4 Sheets-Sheet 3

~INVENTOR~
CARL E. JOHANSSON
BY~ Samuel Reese
~ATT'Y.~

FREIGHT CAR CONSTRUCTION

Original Filed July 19, 1949 4 Sheets-Sheet 4

~INVENTOR~
CARL E. JOHANSSON
BY~ Samuel Reese
~ATT'Y.~

Reissued Nov. 18, 1952 Re. 23,585

UNITED STATES PATENT OFFICE 23,585

FREIGHT CAR CONSTRUCTION

Carl E. Johansson, Cleveland, Ohio, assignor to The Youngstown Steel Door Company, Cleveland, Ohio, a corporation of Ohio Original No. 2,602,405, dated July 8, 1952, Serial No. 105,579, July 19, 1949. Application for reissue July 8, 1952, Serial No. 297,791

11 Claims. (Cl. 105—409)

Matter enclosed in heavy brackets [ ] appears in the original patent but forms no part of this reissue specification; matter printed in italics indicates the additions made by reissue.

This invention relates to freight car construction and particularly to the construction of railway house cars at and adjacent to the door posts.

In accordance with the present day construction of railway box cars 6"x3½"x$\frac{5}{16}$" angle side sills are employed which extend from end to end of the cars. The side sills in the case of house cars which have wider than usual door openings as in automobile box cars and some box cars, are reinforced by means of 15" 40# channels whose upper flanges are riveted to the horizontal legs of the side sills. The reinforcing channels extend across the door openings and for a sufficient distance beyond the door posts. The vertical legs of the side sills are cut down to a height of 2" in the door openings regardless of whether the 6" or the 3½" legs are disposed vertically.

In this construction a further reinforcement is provided at and adjacent to each door post by means of a gusset formed from a ¼" plate secured to the door post by seven rivets in single shear arranged in a vertical row and to the vertical leg of the side sill by twelve rivets in single shear arranged in two horizontal rows. Also the door post is secured to the vertical leg of the side sill by two rivets which are independent of the gusset.

Frequent failures occur in these cars embodying this construction. Fractures develop in the 2" vertical leg of the side sills adjacent to the forward door posts beginning at the top edge and extending progressively through the reinforcing channels. The rivets securing the gussets and the door posts to the vertical legs of the side sills particularly adjacent to the forward door posts work loose or are sheared. And the rivets securing the reinforcing channels to the horizontal legs of the side sills work loose with consequent development of fractures in the horizontal legs of the side sills and upper horizontal flanges of the reinforcing channels between the rivets.

It is the prime purpose of this invention to overcome these difficulties of present day construction of box cars.

A further object is to provide a construction for house cars which shall increase the strength of the side sill structure at the door opening adjacent to the door posts.

A further object is to provide a construction for house cars which shall increase the strength of the connection of the side sill structure to the carside construction at the door posts.

A further object is to provide a construction for house cars which shall increase the strength of the connection of the door posts to the side sill structure.

A further object is to provide a construction for house cars which shall secure an increase in the strength of such cars at and adjacent to the door posts by utilizing connections which place rivets in double shear.

A further object is to provide a construction for house cars which shall obtain a substantial increase in the thickness of the construction in the door opening adjacent to the door posts.

A further object is to provide a construction for house cars which shall obtain a substantial increase in the moment of inertia and section modulus of the construction.

A further object is to provide a construction for house cars which shall utilize gussets to realize a substantial increase in the strength of the connection between the door posts and side sills and side sill reinforcements and prevent tearing of the side sill and side sill reinforcements in the door openings of such cars adjacent to the door posts.

Other objects of the invention will become clear as the description thereof proceeds.

In the drawings forming part of this specification:

*Fig. 7 is an elevational view of the reverse side of Fig. 1.*

Figure 1:
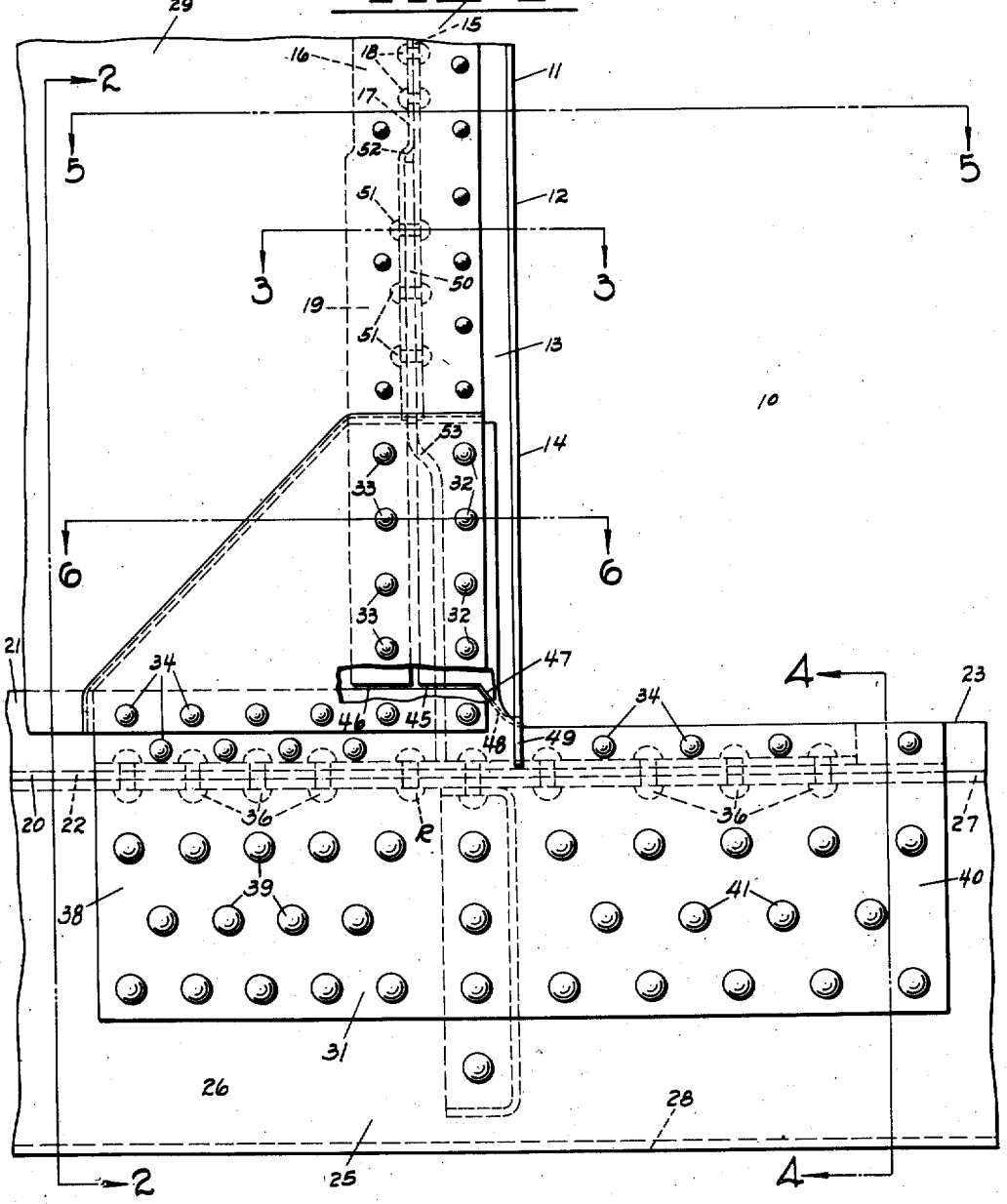
Fig. 1 is a partial elevation showing a construction embodying the instant invention at a forward door post of a house car, a portion being broken away to illustrate certain parts of the construction more clearly.
Figure 1:
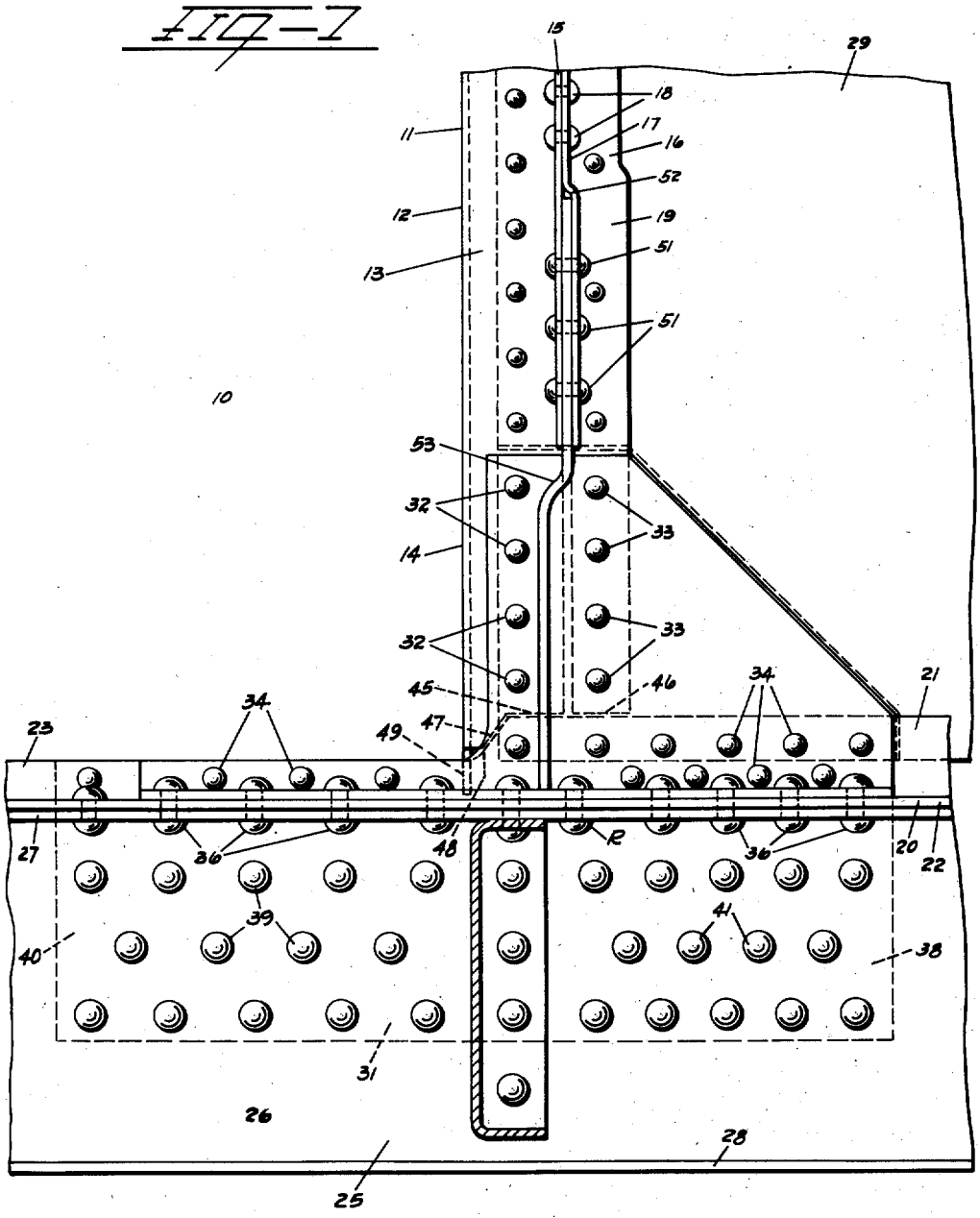

In the drawings a preferred embodiment of the invention is shown at the lower forward portion of a door opening 10 formed in the side 11 of a railway house car. While the invention is illustrated only at the lower forward corner of the door opening, it is preferred that it be utilized as well at the lower rear corner of the door opening. Since the construction embodying the invention is similar at both of these corners of the door opening, it is not believed to be necessary to illustrate the construction at the lower rear corner of the door. However, this construction will become readily apparent by viewing the drawings from the reverse side.

The carside 11 embodies a front door post 12 which comprises a Z-shaped member so arranged that its web 13 extends longitudinally and substantially in the plane of the carside, its flange 14 extending outwardly and its flange 15 extending inwardly. The door post illustrated also comprises an angle member 16 having an inwardly extending leg 17 secured as by means of rivets 18 to the flange 15 of the Z-shaped member 12 and a longitudinally extending leg 19 which is in alinement with the web 13.

The carside also embodies an angle side sill 20 having a vertical upstanding flange 21 and a horizontal inwardly extending flange 22. Within the door opening the upstanding flange 21 is cut down in height as indicated at 23 so that it terminates substantially in the upper plane of the car floor 24. The side sill 20 extends substantially from end to end of the car and is reinforced across the door opening and for a sufficient distance beyond each side of the door opening by means of a channel member 25 arranged with its web 26 vertical and upper and lower flanges 27 and 28 extending inwardly. Metallic sheathing 29 forms part of the carside and is secured by means of riveting to the web 13 of the door post 12 and to the upstanding leg 21 of the side sill.

In order to adequately reinforce the construction hereinabove described at and adjacent to the door opening, the instant invention utilizes inner and outer gusset members 30 and 31. The inner gusset member 30 is secured to the inner face of the web 13 as by means of rivets 32 and to the inner face of the longitudinally extending leg 19 as by means of rivets 33. The inner gusset member 30 is secured to the inner face of the upstanding flange 21 of the side sill by means of a double row of rivets 34.

Figure 5:
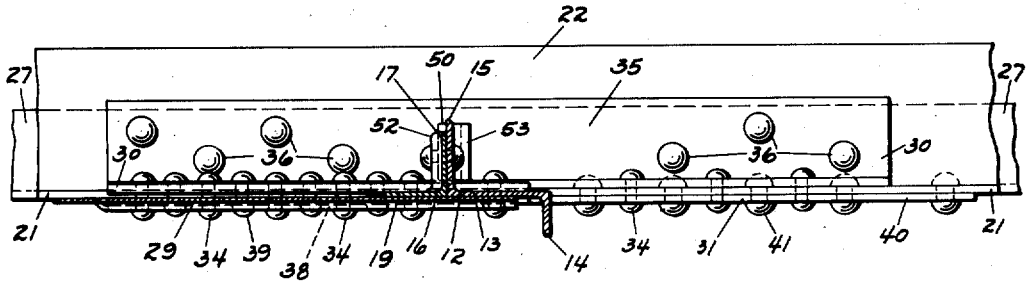
Fig. 5 is a horizontal section taken on line 5—5 of Fig. 1.
Figure 6:
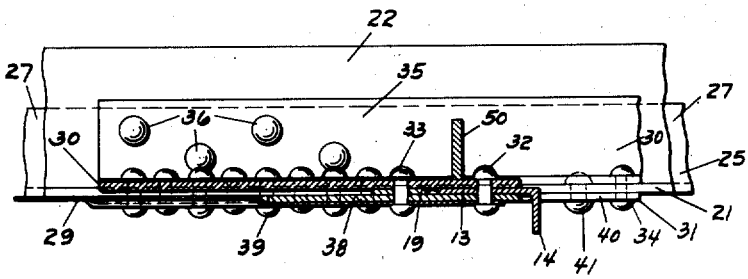
Fig. 6 is a horizontal section taken on line 6—6 of Fig. 1.
Figure 2:
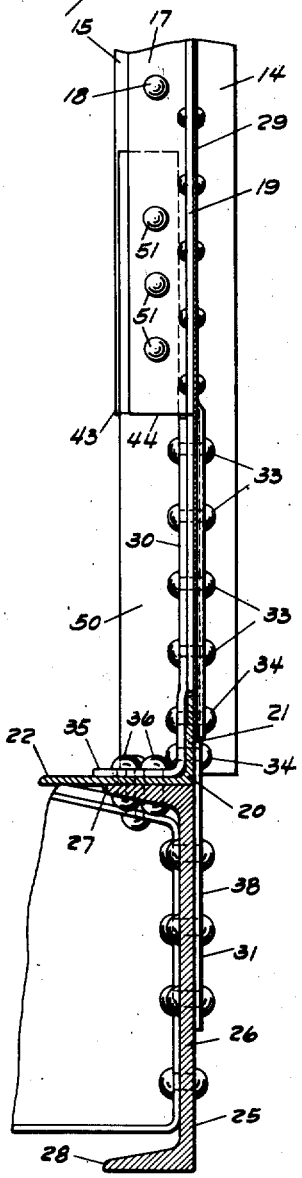
Fig. 2 is a vertical section taken on line 2—2 of Fig. 1.
Figure 4:
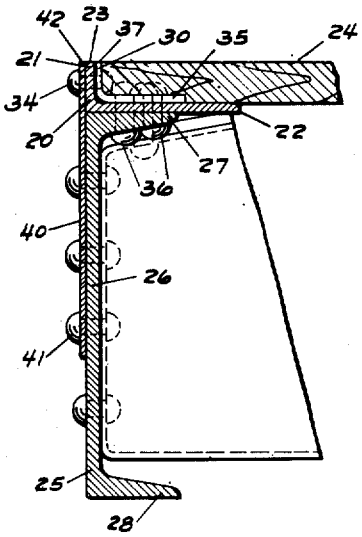
Fig. 4 is a vertical section taken on line 4—4 of Fig. 1.

The lower margin of the inner gusset member is provided with an inwardly extending horizontal flange 35 which is secured as by means of rivets 36 to the horizontal flanges 22 and 27 of the side sill and side sill reinforcement, respectively. As more clearly shown in Figs. 1 and 5 of the drawings, the horizontal flange 35 of the inner gusset member is extended into the door opening and within the opening the inner gusset member is cut down in height as indicated at 37 so that it lies substantially in the upper plane of the car floor. (See Fig. 4).

The outer gusset member 31 is secured by means of the rivets 32 and 33 to the outer face of the web 13 and leg 19, respectively, and to the inner gusset member 30 thereby placing the rivets 32 and 33 in double shear. The outer gusset member 31 is also secured by means of the rivets 34 to the outer face of the upstanding flange 21 of the side sill. Thus the rivets 34 which also secure the inner gusset member 30 to the upstanding flange 21 of the side sill are placed in double shear.

The outer gusset member 31 beyond the door opening is extended downwardly as indicated at 38 and is secured as by means of rivets 39 to the outer face of the web 26 of the side sill reinforcement.

The outer gusset member is also extended along the door opening 10 as indicated at 40 and is also secured to the outer face of the web of the side sill reinforcement as by means of rivets 41. The latter extending portion of the outer gusset member terminates substantially in the upper plane of the car floor as indicated at 42 and is secured to the outer face of the upstanding flange of the side sill by means of the rivets 34 which secure the extending portion of the inner gusset member to the inner face of the flange 21.

By virtue of the invention the moment of inertia and the section modulus of the carside construction has been substantially increased. There has been obtained also a substantial increase in the thickness of the construction in the door opening inasmuch as the inner and outer gusset members are extended into the door opening. Moreover, the construction is such that the securing rivets are placed in double shear.

To avoid conflict between the inwardly extending flange 15 and leg 17 of the door post and the inner gusset member 30, the flange 15 and leg 17 are terminated above the gusset member as indicated at 43 and 44. The web 13 and the longitudinal leg 19 are continuous, however, and are extended so as to terminate above and adjacent to the upper edge of the upstanding leg 21 of the side sill as indicated at 45 and 46. While the web 13 is coped as indicated at 47 to conform to the cope 48 in the leg 21, the outwardly extending flange 14 of the Z-shaped member of the door post is extended downwardly below the door opening as indicated at 49 and is preferably welded to the outer gusset member 31.

Figure 3:
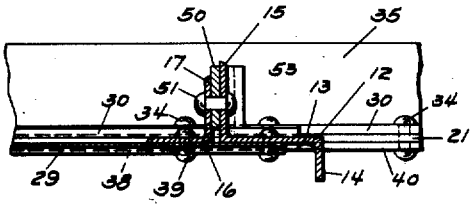
Fig. 3 is a horizontal section taken on line 3—3 of Fig. 1.

To compensate for the loss of strength resulting from the removal of the inwardly extending flange 15 and leg 17, a plate member 50 is disposed between and secured as by means of rivets 51 to the inwardly extending flange 15 and leg 17 as shown more clearly in Figs. 1 and 3 of the drawings. For this purpose the angle member 16 is offset as indicated at 52. The reinforcing plate member 50 is extended downwardly to the inwardly extending flange 35 of the inner gusset member to which it is secured as by means of welding. The offset 53 formed in the reinforcing plate member 50 is for the purpose of avoiding conflict between this member and the rivet R. It will be understood, however, that where such conflict does not occur, the reinforcing member 50 will be straight throughout. This member not only compensates for the loss of material occasioned by the removal of the indicated portions of the flange 15 and leg 17 but also serves to resist outward bulging of the carside at the door post. The rivets 51, moreover, are in double shear.

The disclosed construction has the further salutary effect of removing substantially all tension from the vertical rivets which secure the horizontal flanges of the side sill and side sill reinforcement together. The stress to which these rivets are subjected is essentially a shear stress whose unit value is materially reduced since they are placed in double shear by being driven through the horizontal flange of the inner gusset member.

It will be understood that the disclosed invention is not limited to the type of door post illustrated in the drawings but is capable of use with the various types of door posts employed in house car construction. For example, the door posts may be formed of the Z-shaped member alone without the separate angle member, or of a W-shaped member, or the substantially channel-shaped A. A. R. type door post may be used. Again, any of the known types of welded door posts may be utilized, such as the door post formed of a channel-shaped member and a plate member plain or flanged, the channel-shaped member having unequal legs and disposed with its web parallel to the car side and its flanges directed outwardly and the plate member lying in the plane of the car side and welded to the edge of the shorter leg and to the longer leg in spaced relationship to the edge thereof. The channel member of the welded door post may be replaced by a flanged plate member whose flanges lie parallel to the car side. In the latter construction the first mentioned plate member of the door is welded to the latter plate member as described above.

It will be apparent that numerous changes and modifications in the details of the invention will be clear to those skilled in the art. It is intended, therefore, that all such modifications and changes be comprehended within this invention which is to be limited only by the scope of the claims appended hereto.

I claim:

1. In a house car construction having a door opening, a door post at one side of the door opening, an angle side sill having a horizontal leg and a vertical leg extending from end to end of said car and below the door opening, said vertical leg being cut down in height along the door opening so as to terminate substantially in the upper plane of the car floor, a reinforcement for said side sill having a horizontal flange secured to said horizontal leg and extending downwardly therefrom, said door post terminating above said vertical leg, an inner gusset having a vertical flange secured to the inside of said door post and vertical leg and a horizontal flange secured to said horizontal leg and horizontal flange of said reinforcement beyond the door opening, said flanges of said gusset being extended along said door opening and secured respectively to said vertical leg and said horizontal leg and horizontal flange of said reinforcement, and an outer gusset secured to the outside of said door post, vertical leg and downwardly extended portion of said reinforcement beyond the door opening, said outer gusset being extended along said door opening and secured to said vertical leg and said downwardly extending portion of said reinforcement, the extended portions of said outer gusset and vertical flange of said inner gusset terminating substantially in the upper plane of the car floor.

2. In a house car construction having a door opening, a door post at one side of the door opening, a side sill having a horizontal leg and vertical leg extending from end to end of said car and below the door opening, said vertical leg being cut down in height along the door opening so as to terminate substantially in the upper plane of the car floor, a reinforcement for said side sill secured thereto and extending downwardly therefrom, an inner gusset having a vertical flange secured to [the inside of] said door post and vertical leg and a horizontal flange secured to said horizontal leg beyond the door opening, said flanges of said gusset being extended along said door opening and secured respectively to said vertical leg and said horizontal leg, and an outer gusset secured to the outside of said door post, vertical leg and downwardly extending side sill reinforcement beyond the door opening, said outer gusset being extended along said door opening and secured to said vertical leg and said downwardly extending side sill reinforcement, the extended portions of said outer gusset and vertical flange of said inner gusset terminating substantially in the upper plane of the car floor.

3. In a house car construction, a door post, a side sill having a horizontal leg and a vertical leg, a reinforcement for said side sill secured thereto and extending downwardly therefrom, an inner gusset having a vertical flange secured to [the inside of] said door post and vertical leg and a horizontal flange secured to said horizontal leg and an outer gusset secured to the outside of said door post, vertical leg and downwardly extending side sill reinforcement.

4. In a house car construction having a door opening, a door post at one side of the door opening, a side sill having a horizontal leg and vertical leg extending from end to end of said car and below the door opening, said vertical leg being cut down in height along the door opening so as to terminate substantially in the upper plane of the car floor, a reinforcement for said side sill secured thereto and extending downwardly therefrom, and a gusset secured to the outside of said door post, vertical leg and downwardly extending side sill reinforcement beyond the door opening, said gusset being extended along said door opening and secured to said vertical leg and said downwardly extending side sill reinforcement, the extended portion of said gusset terminating substantially in the upper plane of the car floor.

5. In a house car construction having a door opening, a door post at one side of the door opening, a side sill having a horizontal leg and a vertical leg extending from end to end of said car and below the door opening, said vertical leg being cut down in height along the door opening so as to terminate substantially in the upper plane of the car floor, a reinforcement for said side sill secured thereto and extending downwardly therefrom, an inner gusset having a vertical flange secured to [the inside of] said door post and vertical leg and a horizontal flange secured to said horizontal leg beyond the door opening, said flanges of said gusset being extended along said door opening and secured respectively to said vertical leg and said horizontal leg, and an outer gusset secured to the oustide of said vertical leg and downwardly extending side sill reinforcement beyond the door opening, said outer gusset being extended along said door opening and secured to said vertical leg and said downwardly extending side sill reinforcement, the extended portions of said outer gusset and vertical flange of said inner gusset terminating substantially in the upper plane of the car floor.

6. In a house car construction having a door opening, a door post at one side of the door opening, a side sill having a horizontal leg and a vertical leg extending from end to end of said car and below the door opening, said vertical leg being cut down in height along the door opening so as to terminate substantially in the upper plane of the car floor, a reinforcement for said side sill secured thereto and extending downwardly therefrom, a gusset having a vertical flange secured to [the inside of]said door post and vertical leg and a horizontal flange secured to said horizontal leg beyond the door opening, said flanges of said gusset being extended along said door opening and secured respectively to said vertical leg and said horizontal leg, the extended portion of said vertical flange of said gusset terminating substantially in the upper plane of the car floor.

7. In a house car construction having a door opening, a door post at one side of the door opening, a side sill having a horizontal leg and a vertical leg extending from end to end of said car and below the door opening, said vertical leg being cut down in height along the door opening so as to terminate substantially in the upper plane of the car floor, an inner gusset having a vertical flange secured to [the inside of] said door post and vertical leg and a horizontal flange secured to said horizontal leg beyond the door opening, said flanges of said gusset being extended along said door opening and secured respectively to said vertical leg and said horizontal leg, and an outer gusset secured to the outside of said door post and vertical leg beyond the door opening, said outer gusset being extended along said door opening and secured to said vertical leg, the extended portions of said outer gusset and vertical flange of said inner gusset terminating substantially in the upper plane of the car floor.

8. In a house car construction having a door opening, a door post at one side of the door opening, a side sill having a vertical leg extending from end to end of said car below said door opening, said leg being cut down in height along the door opening so as to terminate substantially in the upper plane of the car floor, a reinforcement for said sill secured thereto and extending downwardly therefrom, an inner gusset secured to [the inside of] said door post and vertical leg beyond said door opening, said gusset being extended along said door opening and secured to said vertical leg, and an outer gusset secured to the outside of said door post, vertical leg and downwardly extending side sill reinforcement beyond said door opening, said outer gusset being extended along said door opening and secured to said vertical leg and downwardly extending side sill reinforcement, the extended portions of said gussets terminating substantially in the upper plane of the car floor.

9. In a house car construction having a door opening, a door post at one side of the door opening, a side sill having a horizontal leg and a vertical leg extending from end to end of said car and below the door opening, said vertical leg being cut down in height along the door opening so as to terminate substantially in the upper plane of the car floor, a gusset secured to [the inside of] said door post and vertical leg beyond the door opening, said gusset being extended along said door opening and secured to said vertical leg, the extended portion of said gusset terminating substantially in the upper plane of the car floor.

10. In a house car construction having a door opening, a door post at one side of the door opening, said door post comprising a substantially Z-shaped member and an angle member, said Z-shaped member having a longitudinally extending web and inwardly and outwardly directed flanges, said angle member having an inwardly directed flange and a longitudinally extending flange alined with said web, a side sill having a horizontal leg and a vertical leg extended from end to end of the car and below the door opening, said vertical leg being cut down in height along the door opening so as to terminate substantially in the upper plane of the car floor, a reinforcement for said sill secured thereto and extending downwardly therefrom, an inner gusset having a vertical flange secured to the inside of said web, longitudinal flange of said angle member and vertical leg of said sill beyond the door opening, said inwardly directed flanges of said Z-shaped and angle members terminating above said vertical flange of said gusset, said gusset having a horizontal flange secured to the horizontal leg of said sill beyond the door opening, said flanges of said gusset being extended along said door opening and secured respectively to said vertical leg and said horizontal leg, and an outer gusset secured to the outside of said web, longitudinal flange, vertical leg and downwardly extending side sill reinforcement beyond the door opening, said outer gusset being extended along said door opening and secured to said vertical leg and said downwardly extending side sill reinforcement, the extended portions of said outer gusset and vertical flange of said inner gusset terminating substantially in the upper plane of the car floor.

11. In a house car construction having a door opening, a door post at one side of the door opening, said door post comprising a substantially Z-shaped member and an angle member, said Z-shaped member having a longitudinally extending web and inwardly and outwardly directed flanges, said angle member having an inwardly directed flange and a longitudinally extending flange alined with said web, a side sill having a horizontal leg and a vertical leg extending from end to end of the car and below the door opening, said vertical leg being cut down in height along the door opening so as to terminate substantially in the upper plane of the car floor, a reinforcement for said sill secured thereto and extending downwardly therefrom, an inner gusset having a vertical flange secured to the inside of said web, longitudinal flange of said angle member and vertical leg of said sill beyond the door opening, said inwardly directed flanges of said Z-shaped and angle members terminating above said vertical flange of said gusset, said gusset having a horizontal flange secured to the horizontal leg of said sill beyond the door opening, said flanges of said gusset being extended along said door opening and secured respectively to said vertical leg and said horizontal leg, and an outer gusset secured to the outside of said web, longitudinal flange, vertical leg and downwardly extending side sill reinforcement beyond the door opening, said outer gusset being extended along said door opening and secured to said vertical leg and said downwardly extending side sill reinforcement, the extended portions of said outer gusset and vertical flange of said inner gusset terminating substantially in the upper plane of the car floor, a portion of said inwardly directed flanges of said post being spaced apart, and a reinforcing member disposed between and secured to said spaced apart portion of said post flanges, said reinforcing member extending downwardly and being secured to the vertical and horizontal flanges of said inner gusset.

CARL E. JOHANSSON.

REFERENCES CITED

The following references are of record in the file of this patent or the original patent:

UNITED STATES PATENTS

| Number | Name | Date |
|---|---|---|
| Re. 22,868 | Ditchfield | Apr. 15, 1947 |
| 1,074,793 | Howard | Oct. 7, 1913 |
| 1,079,652 | Knox | Nov. 25, 1913 |
| 1,949,745 | Jackson | Mar. 6, 1934 |
| 2,193,194 | Geary | Mar. 12, 1940 |
| 2,317,677 | Doyle | Apr. 27, 1943 |
| 2,361,276 | Duffie | Oct. 24, 1944 |